United States Patent
Nelson et al.

(10) Patent No.: US 9,815,557 B2
(45) Date of Patent: Nov. 14, 2017

(54) AIRCRAFT HUMIDIFIER

(71) Applicant: Humbay Health, LLC, Kirkland, WA (US)

(72) Inventors: Robert C. Nelson, Kirkland, WA (US); Michael D. Ross, Mercer Island, WA (US); Jeffrey S. Baylor, Seattle, WA (US)

(73) Assignee: Humbay Health, LLC, Kirkland, WA (US)

( * ) Notice: Subject to any disclaimer, the term of this patent is extended or adjusted under 35 U.S.C. 154(b) by 623 days.

(21) Appl. No.: 14/033,376

(22) Filed: Sep. 20, 2013

(65) Prior Publication Data

US 2014/0077396 A1 Mar. 20, 2014

Related U.S. Application Data

(60) Provisional application No. 61/703,690, filed on Sep. 20, 2012.

(51) Int. Cl.
*B64D 13/06* (2006.01)
*B64D 11/00* (2006.01)

(52) U.S. Cl.
CPC .......... *B64D 13/06* (2013.01); *B64D 11/0007* (2013.01); *B64D 2013/064* (2013.01);
(Continued)

(58) Field of Classification Search
CPC .......... F24F 2006/008; F24F 2006/143; B64D 2013/0662; B01F 3/04255; B01F 2003/04163; B01F 2003/04276; C02F 1/74; C02F 3/205; F16C 32/0402; F16C 17/00; F04D 29/057; F04D 29/058; F04D 29/056; Y02W 10/15

See application file for complete search history.

(56) References Cited

U.S. PATENT DOCUMENTS 1,835,812 A * 12/1931 Ridler ................. F24F 3/12
261/153
2,585,570 A * 2/1952 Messinger ............. B64D 13/06
454/74

(Continued)

FOREIGN PATENT DOCUMENTS

DE       29705398 U1 *  5/1997  .......... B60H 1/3229
DE    EP 1386837 A1 *  2/2004  ............ B64D 13/06

(Continued)

OTHER PUBLICATIONS

"Smart Fog®: Humidity for Life," © 2011, Smart Fog Inc., Reno, Nev., 12-page brochure.

(Continued)

*Primary Examiner* — Amber R Orlando
*Assistant Examiner* — Stephen Hobson
(74) *Attorney, Agent, or Firm* — Christensen O'Connor Johnson Kindness PLLC

(57) ABSTRACT

An aircraft humidifier is engineered as a stand-alone, fully integrated aircraft humidifier that is suitable for providing uniform, non-wetting humidified air disbursed by the aircraft humidifier into ambient air to increase the relative humidity in low humidity environments such as aircraft interiors, including cockpits, cabins, crew rests, cargo holds, and lavatories as well as any other enclosed areas.

9 Claims, 15 Drawing Sheets

Figure 1:
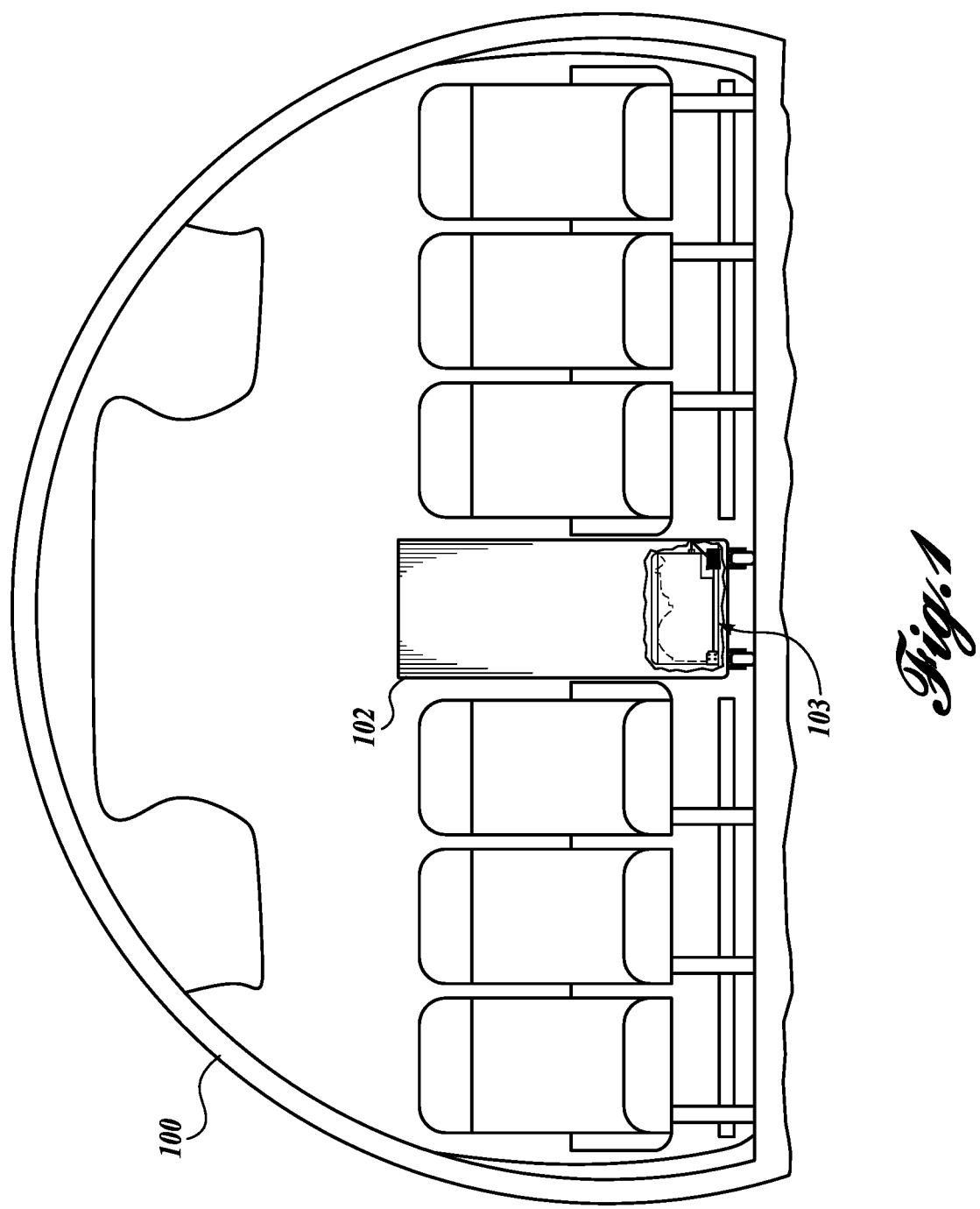
Figure 2:
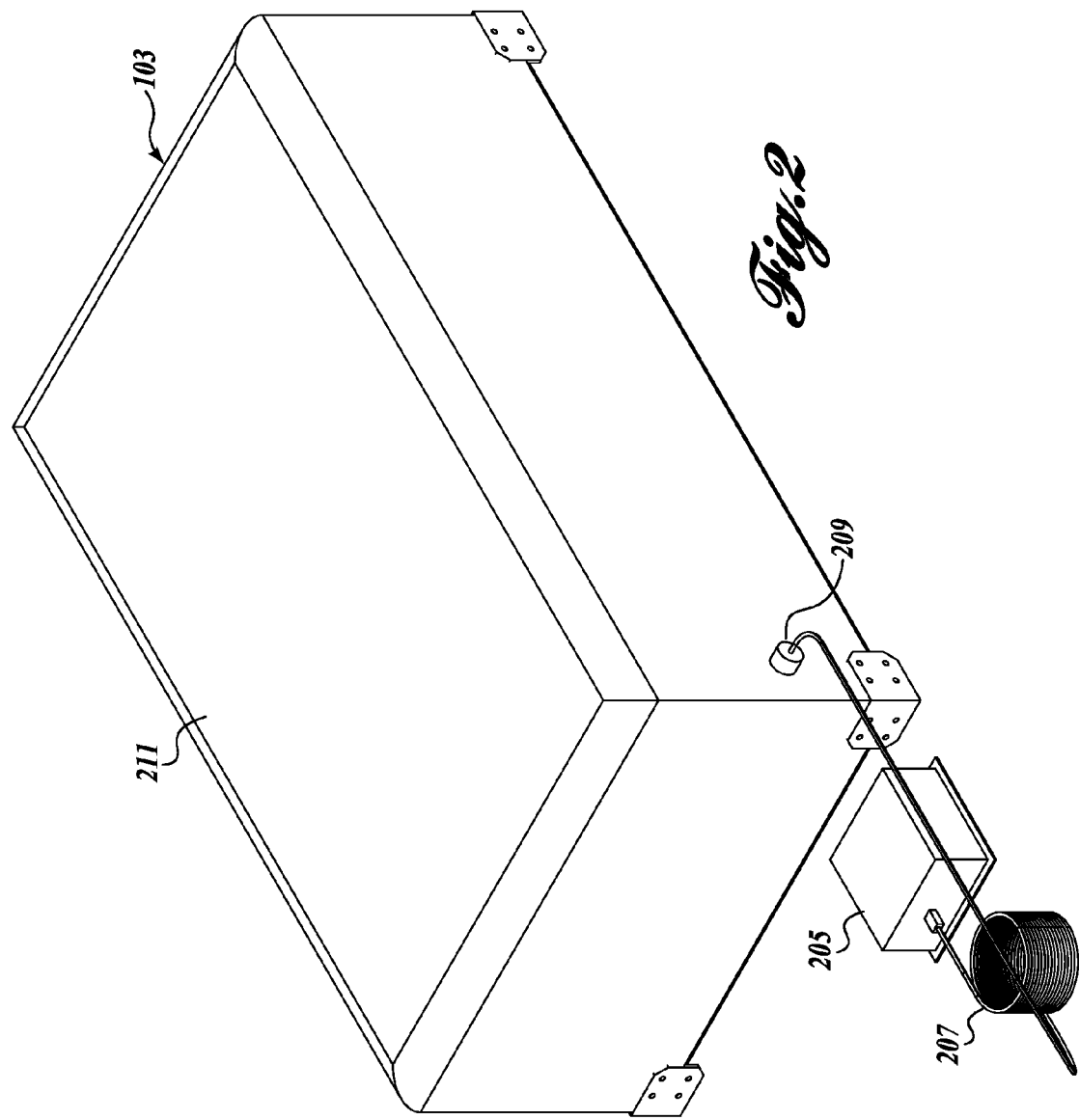
Figure 3:
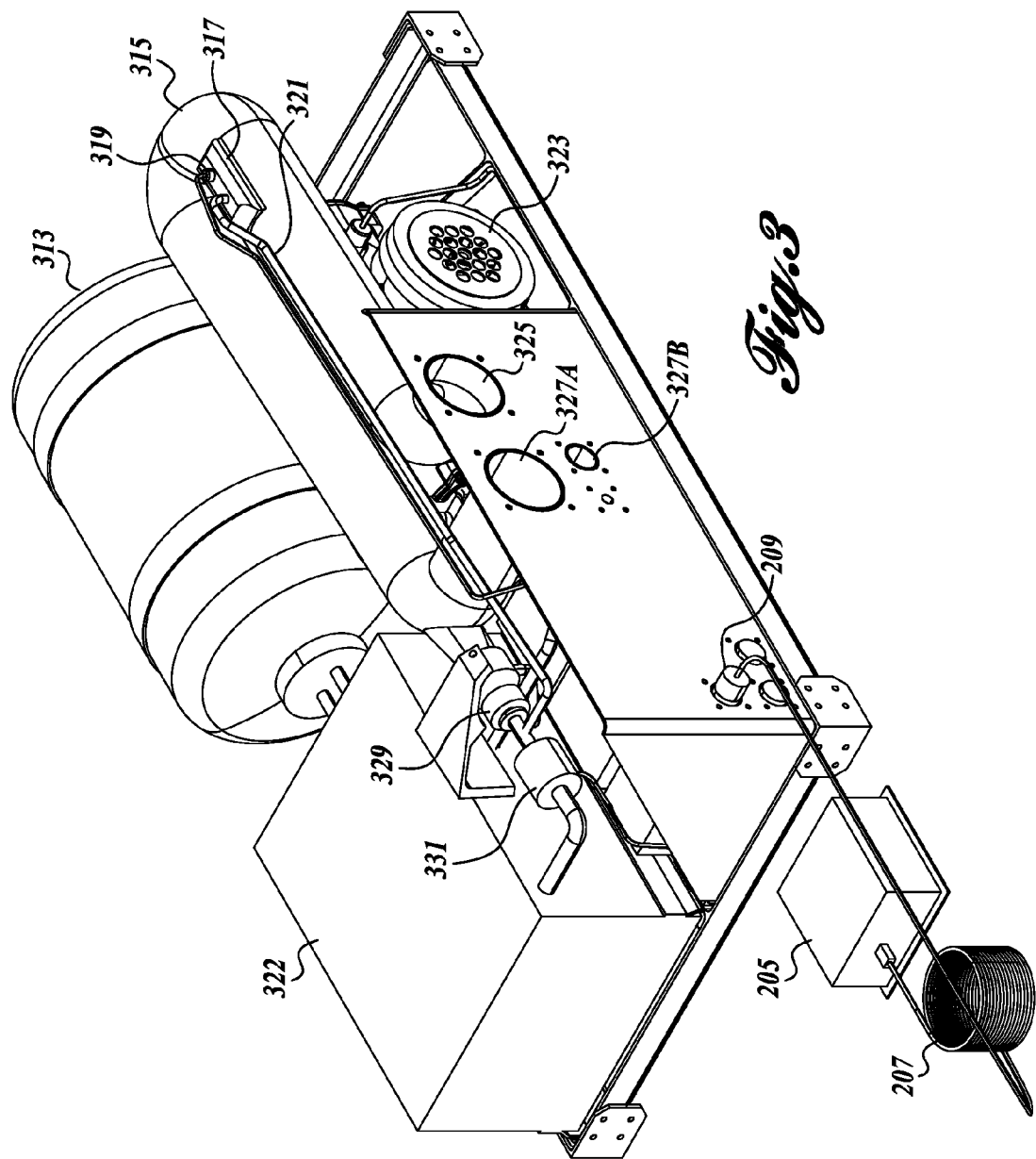
Figure 4:
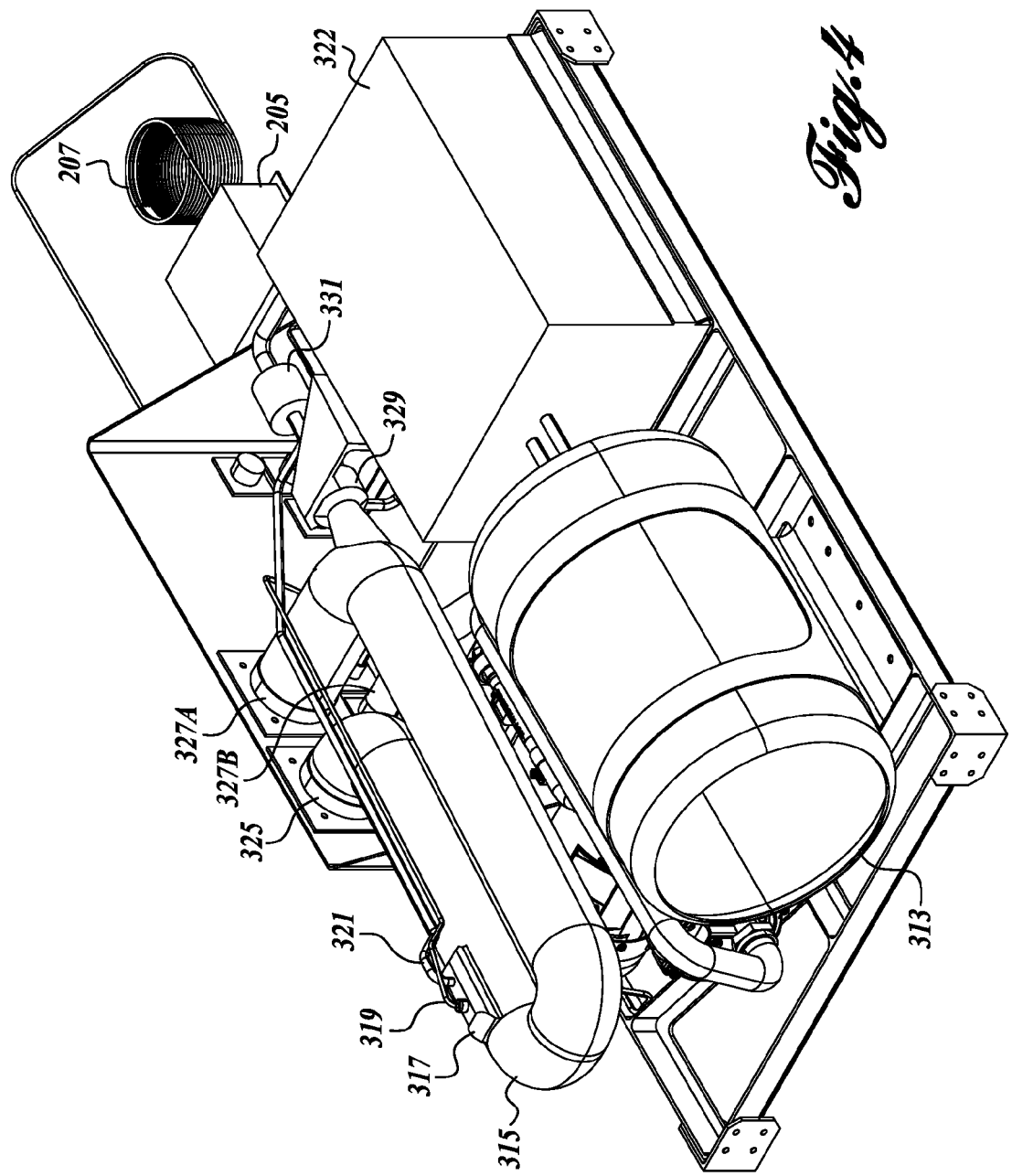
Figure 5:
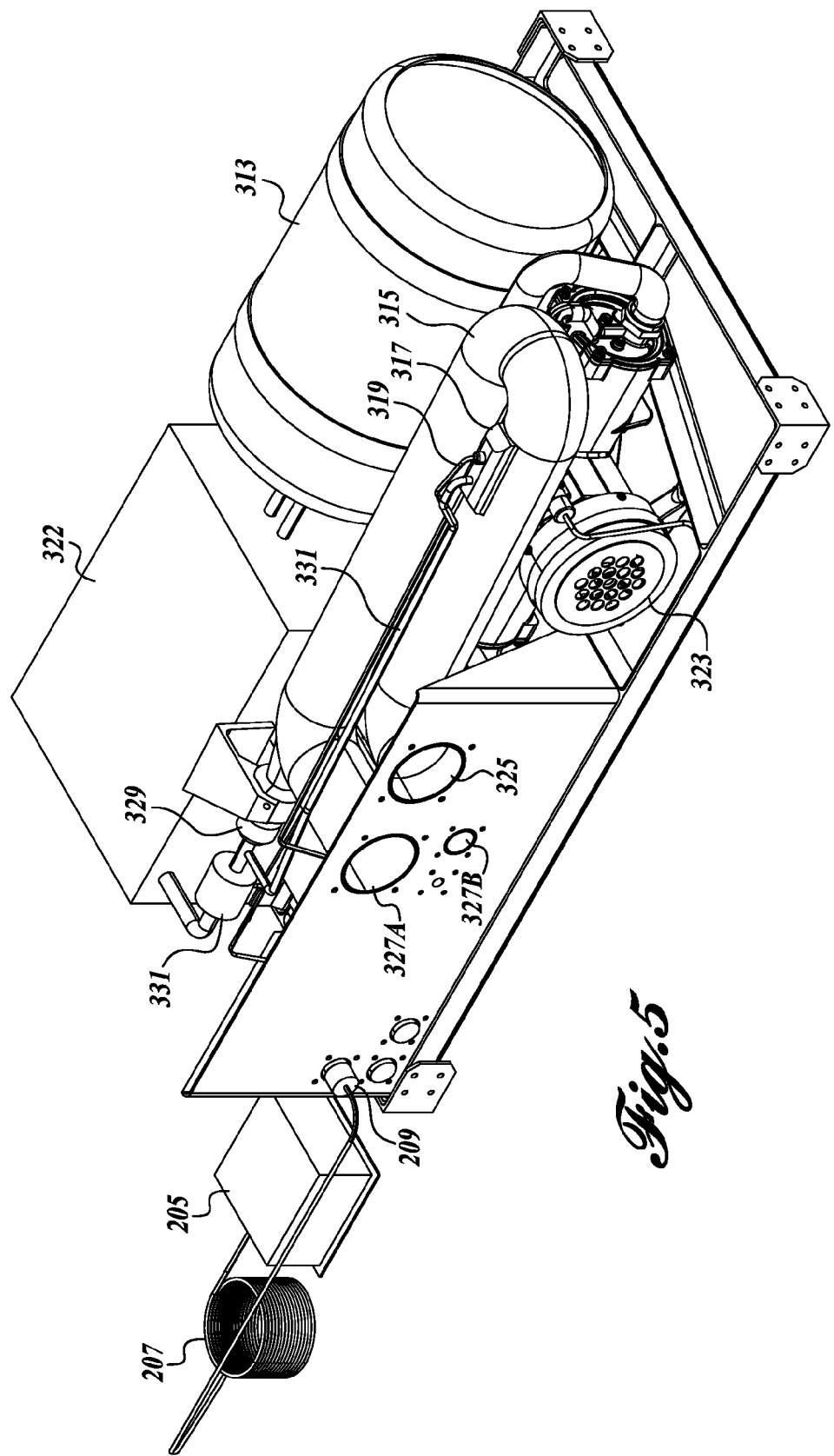
Figure 6:
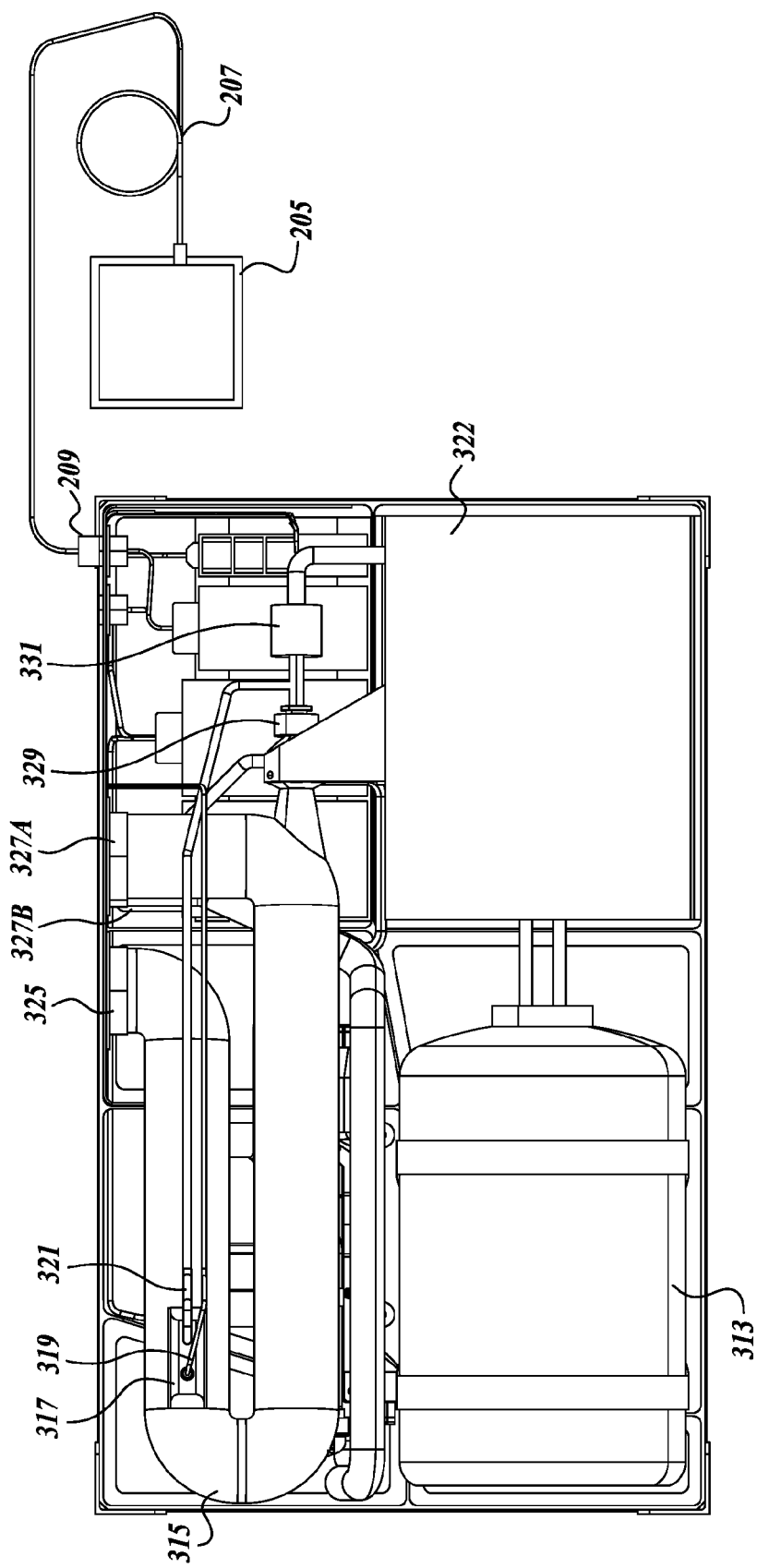

(52) U.S. Cl.
CPC ............. *B64D 2013/0625* (2013.01); *B64D 2013/0651* (2013.01); *B64D 2013/0662* (2013.01); *B64D 2013/0666* (2013.01); *B64D 2013/0674* (2013.01); *B64D 2013/0688* (2013.01)

(56) References Cited

U.S. PATENT DOCUMENTS

| | | | | |
|---|---|---|---|---|
| 2,979,916 A * | 4/1961 | Mason | B64D 13/06 | 236/92 R |
| 3,097,504 A * | 7/1963 | Quick | B64D 13/06 | 62/241 |
| 3,510,252 A * | 5/1970 | Reich | F24F 3/14 | 137/171 |
| 3,770,254 A * | 11/1973 | Morrow | F24F 3/14 | 261/105 |
| 3,990,427 A * | 11/1976 | Clinebell | F24F 6/12 | 126/113 |
| 4,086,305 A * | 4/1978 | Dobritz | A61M 16/16 | 128/204.13 |
| 4,211,735 A * | 7/1980 | Berlin | F24F 6/14 | 126/113 |
| 4,239,956 A * | 12/1980 | Morton | F24F 6/18 | 126/113 |
| 4,564,375 A * | 1/1986 | Munk | B05B 7/0483 | 239/589.1 |
| 4,829,775 A * | 5/1989 | Defrancesco | B64D 13/06 | 62/402 |
| 5,402,967 A * | 4/1995 | Hughes | B64D 13/06 | 169/62 |
| 5,524,848 A * | 6/1996 | Ellsworth | B64D 13/00 | 244/118.5 |
| 5,598,837 A * | 2/1997 | Sirianne, Jr. | A61M 16/16 | 128/203.12 |
| 5,788,893 A * | 8/1998 | Montagnino | F24F 6/16 | 261/91 |
| 5,791,982 A * | 8/1998 | Curry | B64D 13/00 | 244/118.5 |
| 5,873,256 A * | 2/1999 | Denniston | B60H 1/00414 | 62/244 |
| 6,092,794 A * | 7/2000 | Reens | B01F 3/04049 | 261/115 |
| 6,099,404 A * | 8/2000 | Hartenstein | B64D 13/00 | 126/113 |
| 6,406,006 B1 * | 6/2002 | Dettling | A47F 3/001 | 261/115 |
| 6,551,184 B1 * | 4/2003 | Mayer | B64D 11/06 | 454/120 |
| 6,666,039 B2 * | 12/2003 | Mitani | B64D 13/06 | 62/172 |
| 6,734,405 B2 * | 5/2004 | Centanni | A61L 2/07 | 219/628 |
| 7,066,452 B2 * | 6/2006 | Rotering | F24F 6/025 | 261/142 |
| 7,188,488 B2 * | 3/2007 | Army, Jr. | B64D 13/08 | 62/401 |
| 8,128,069 B2 * | 3/2012 | Reens | F24F 6/12 | 261/116 |
| 8,602,398 B2 * | 12/2013 | Hayasi | A61H 33/06 | 261/130 |
| 8,720,439 B1 * | 5/2014 | Kolkowski | A61M 16/16 | 128/203.12 |
| 8,939,129 B2 * | 1/2015 | Prinz | F02M 21/047 | 123/518 |
| 8,985,966 B2 * | 3/2015 | Sampson | B01F 3/02 | 261/76 |
| 9,227,730 B2 * | 1/2016 | Markwart | B64D 13/00 | |
| 9,550,574 B2 * | 1/2017 | Davis | B64D 13/00 | |
| 2002/0134321 A1 * | 9/2002 | Alix | B64D 13/00 | 122/21 |
| 2005/0127540 A1 * | 6/2005 | Han | F22B 1/284 | 261/119.1 |
| 2009/0189018 A1 * | 7/2009 | Dittmar | B64C 1/066 | 244/121 |
| 2009/0321544 A1 * | 12/2009 | Akisada | B60H 3/0078 | 239/704 |
| 2010/0028201 A1 * | 2/2010 | Neister | A61L 2/0011 | 422/24 |
| 2010/0043794 A1 * | 2/2010 | Saito | B64D 11/06 | 128/204.22 |
| 2011/0171065 A1 * | 7/2011 | Park | A61L 2/22 | 422/33 |
| 2013/0210329 A1 * | 8/2013 | God | B64D 11/02 | 454/71 |
| 2013/0240355 A1 * | 9/2013 | Ho | B01D 63/10 | 204/451 |
| 2014/0145012 A1 * | 5/2014 | Ritchie | F24F 5/0035 | 239/424 |
| 2014/0271347 A1 * | 9/2014 | Park | A61L 2/06 | 422/3 |
| 2014/0286122 A1 * | 9/2014 | Livshits | B01F 5/0057 | 366/165.1 |
| 2015/0059745 A1 * | 3/2015 | Barker | A61M 16/0066 | 128/203.14 |
| 2015/0090119 A1 * | 4/2015 | Au | B64D 13/06 | 95/57 |
| 2015/0121909 A1 * | 5/2015 | Koenig | B64D 13/06 | 62/61 |
| 2015/0343399 A1 * | 12/2015 | Kim | C10L 1/125 | 435/408 |
| 2016/0325245 A1 * | 11/2016 | Delerue | B01F 5/0413 | |

FOREIGN PATENT DOCUMENTS

| | | | | |
|---|---|---|---|---|
| DE | FR 2857274 A1 * | 1/2005 | ............ | B01D 45/16 |
| DE | WO 2009007094 A2 * | 1/2009 | ............ | B64D 13/06 |
| DE | WO 2011089016 A2 * | 7/2011 | ............ | B64D 11/02 |
| FR | 2742121 A1 * | 6/1997 | ............ | B64D 11/00 |
| JP | 2012021729 A * | 2/2012 | | |

OTHER PUBLICATIONS

"HumBayHealth™ Humidity Solutions: The Next Big, Tiny Technology in Aerospace Humidity Control," Humbay Health, LLC, Kirkland, Wash., Sep. 12, 2011, 2-page brochure.

* cited by examiner

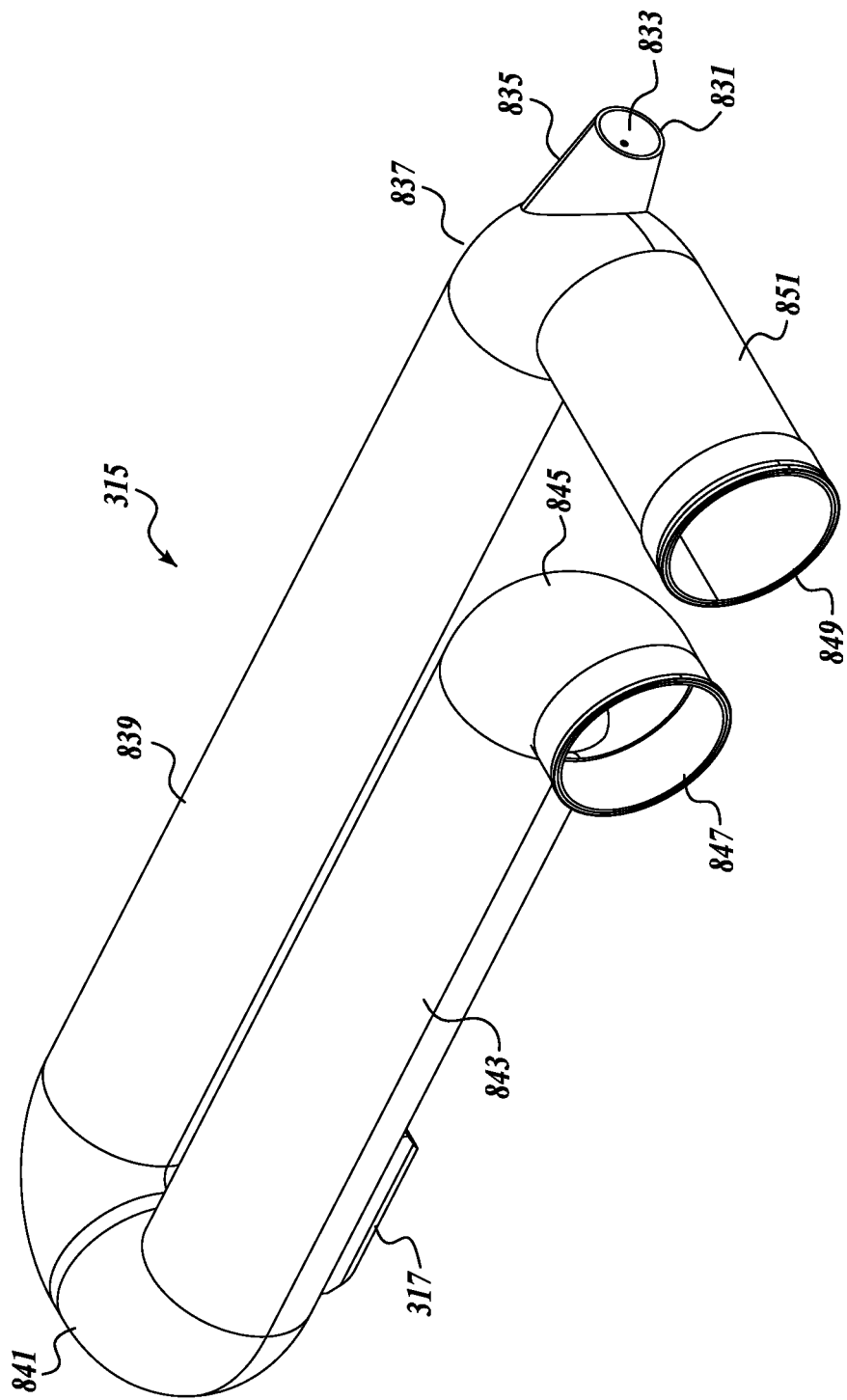

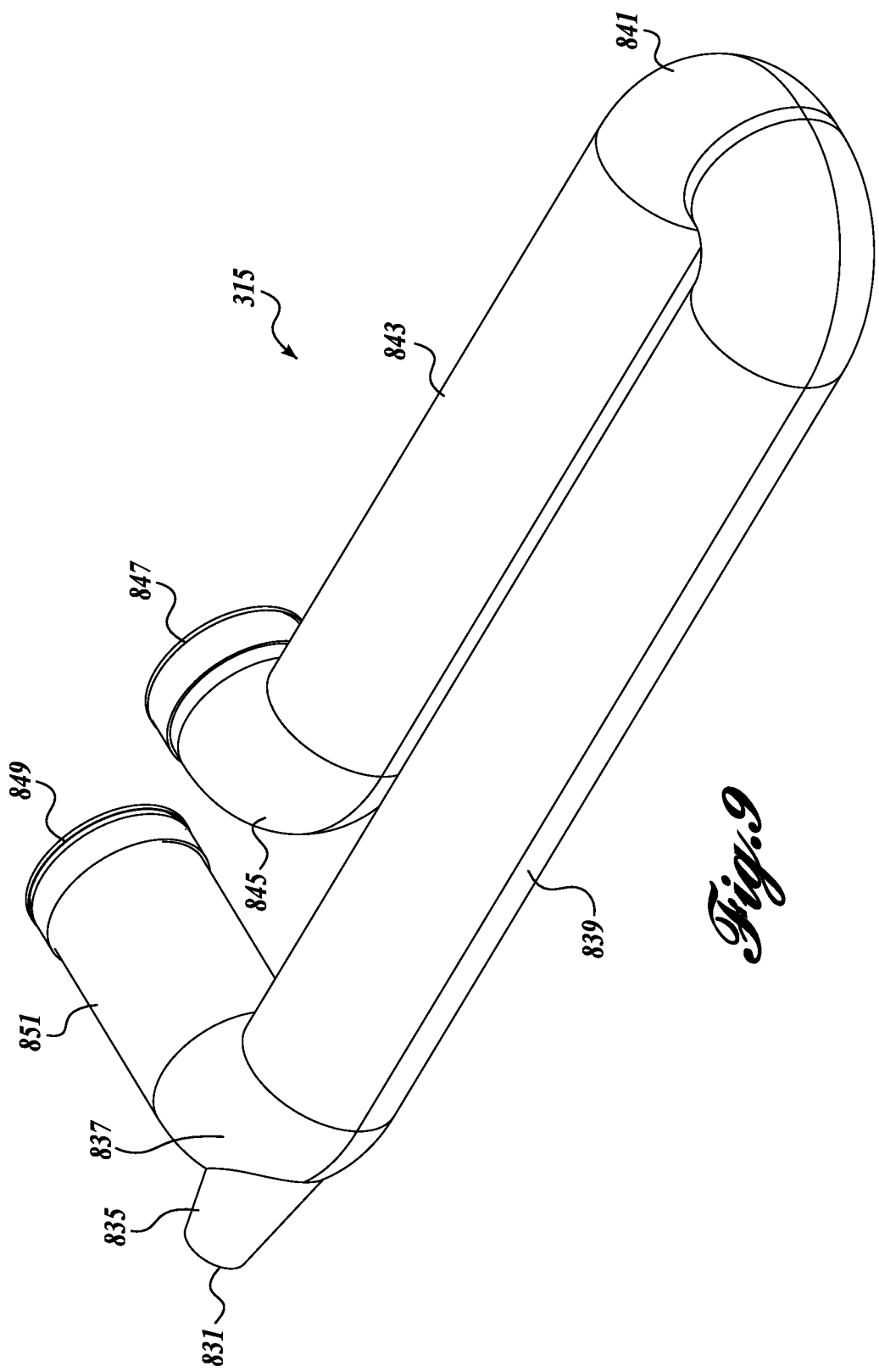

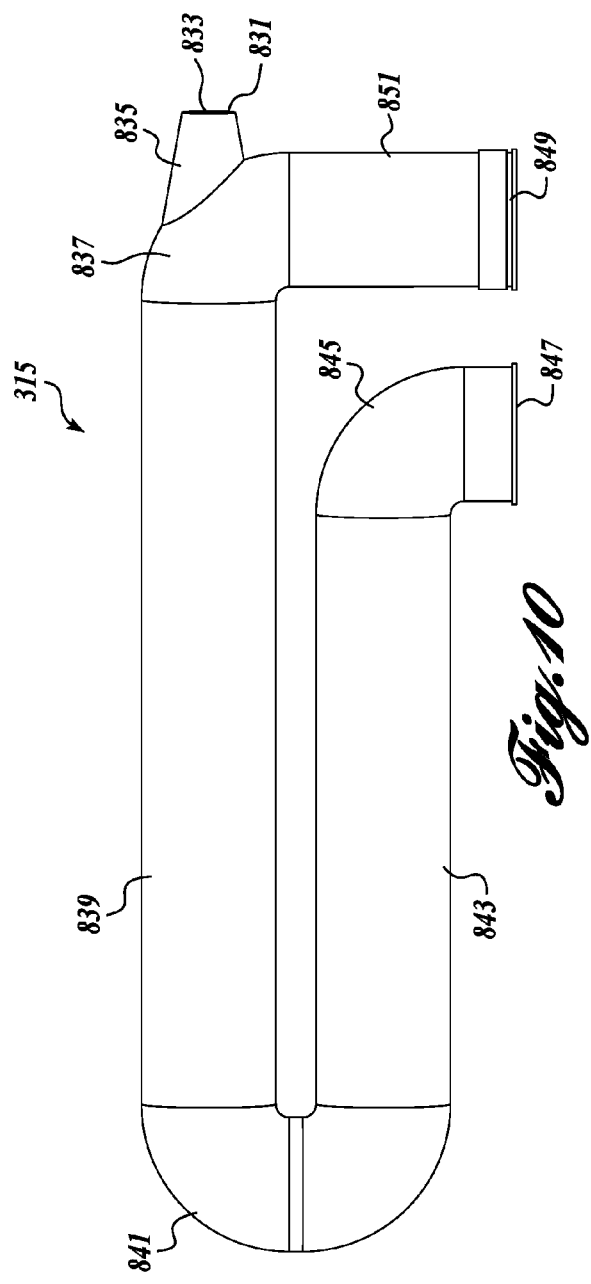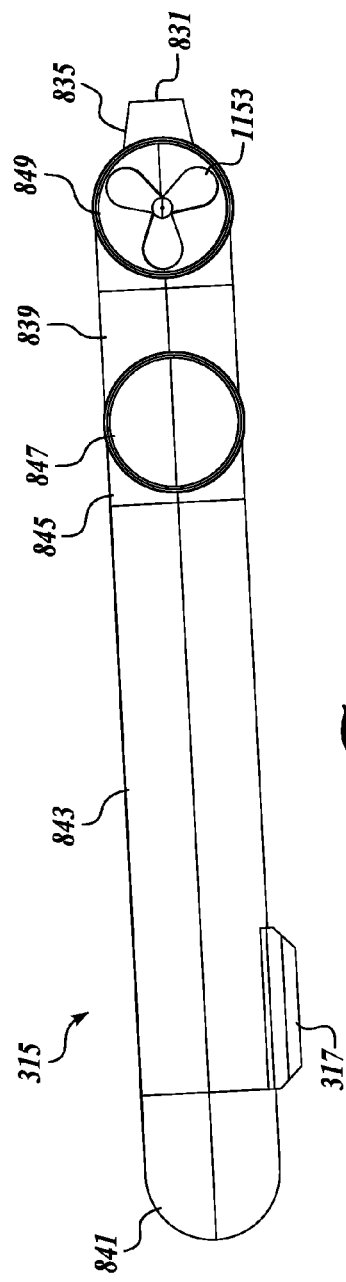

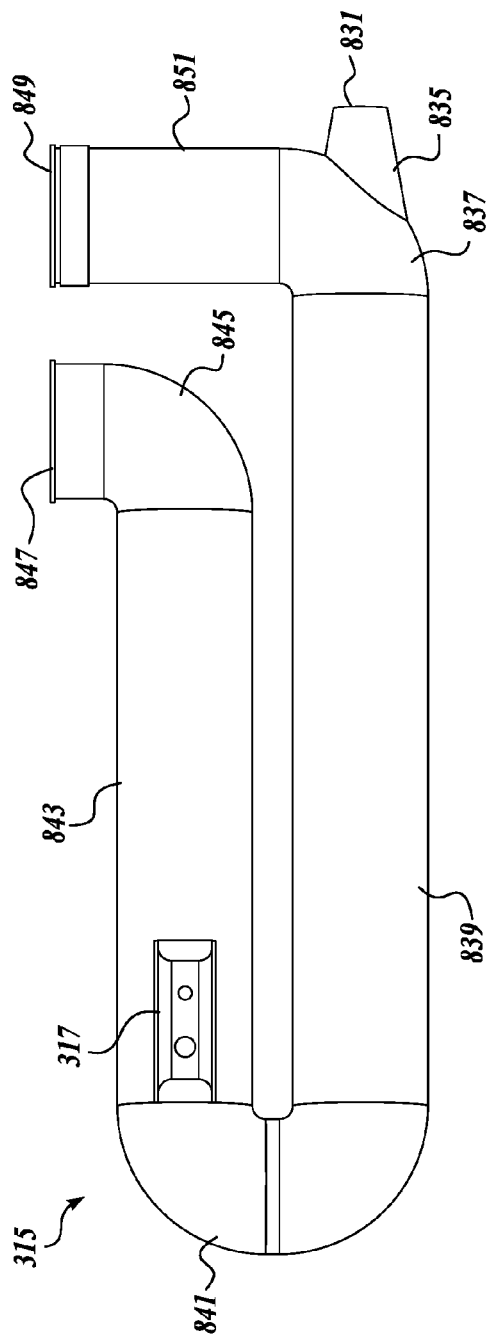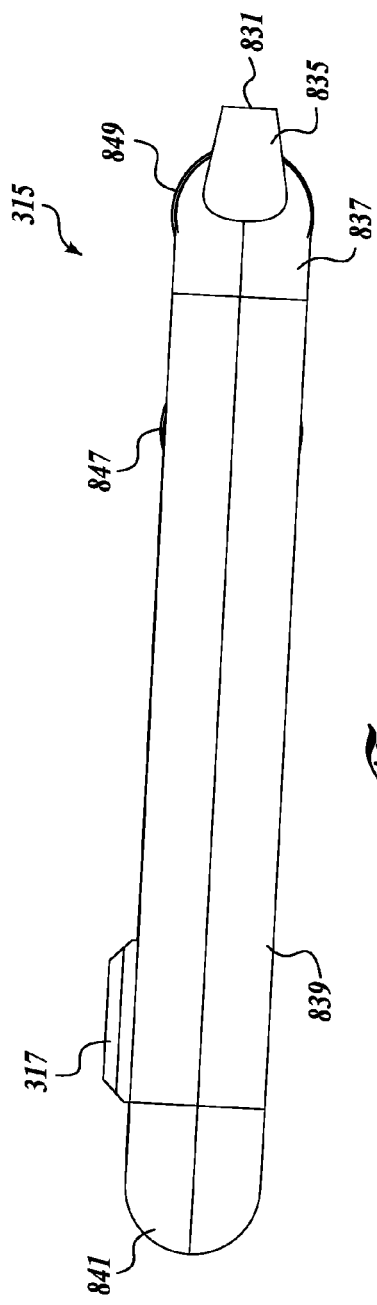

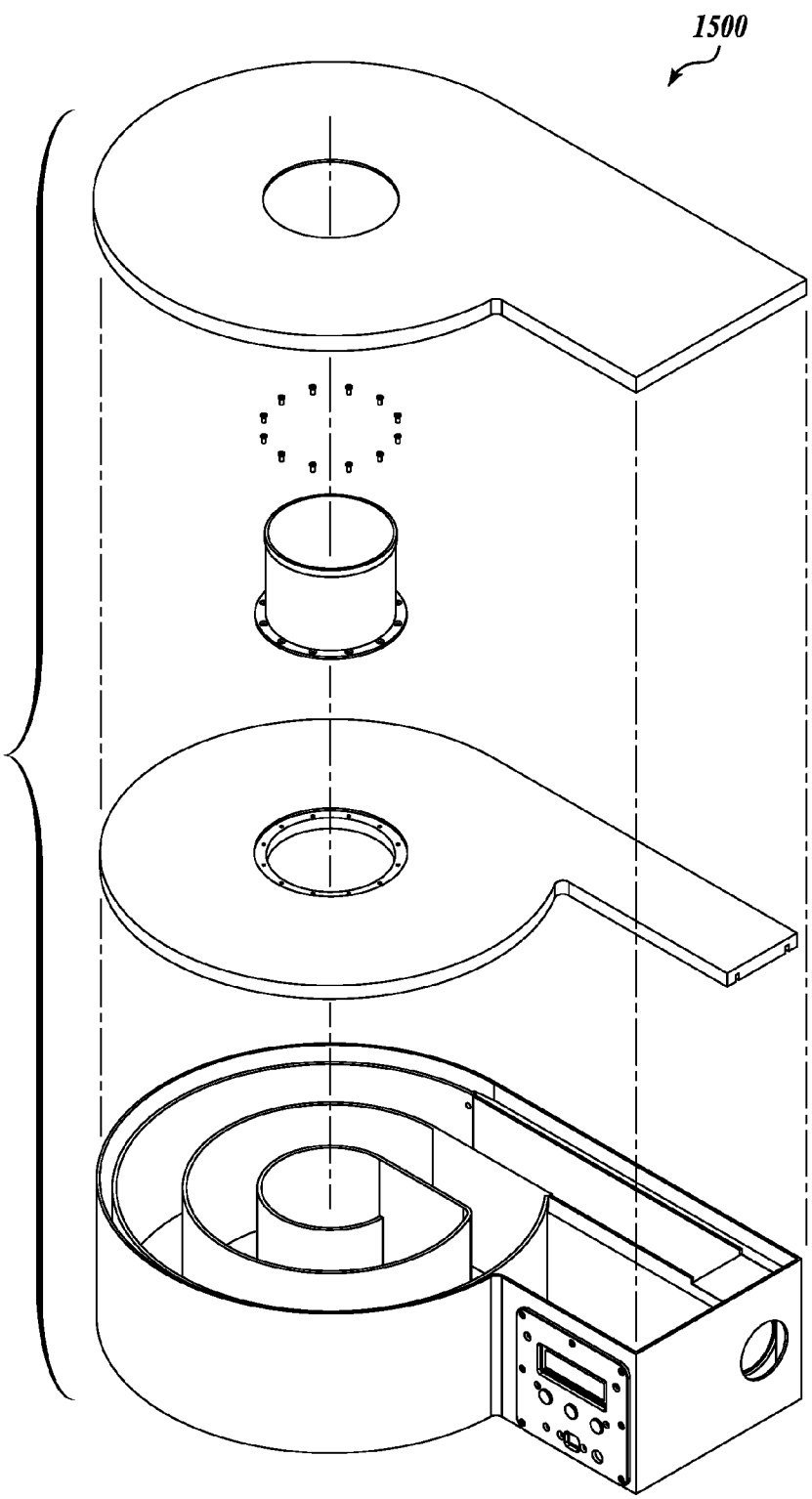

AIRCRAFT HUMIDIFIER

CROSS-REFERENCE TO RELATED APPLICATION

This application claims the benefit of Provisional Application No. 61/703,690, filed Sep. 20, 2012, which is incorporated herein by reference.

TECHNICAL FIELD

The present subject matter generally relates to aircraft environmental control systems, and more particularly, it relates to humidity control.

BACKGROUND

The environmental control system of an aircraft provides air supply, thermal control, and cabin pressurization for the crew and passengers. The atmosphere at typical jetliner cruising altitudes is generally very dry and cold, and outside air is pumped into the cabin on a long flight. Consequently, when humid air at lower altitudes is encountered and drawn in, the environmental control system dries it through the warming and cooling cycle, so that even with high external relative humidity, inside the cabin it will usually be not much higher than 10% relative humidity. Although low cabin humidity has health benefits such as preventing the growth of fungi and bacteria, the low humidity causes a drying of the skin, eyes, and mucosal membranes and contributes to dehydration, which leads to fatigue, discomfort, and health issues.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter includes a device form which recites an aircraft humidifier comprising a water filtration system that is suitable to produce filtered water without freezing, the water filtration system operating by static water pressure from an aircraft and including stages selected from a group consisting essentially of reverse osmosis and deionization. The aircraft humidifier further comprises a duct that is capable of receiving atomized water droplets formed from the filtered water and compressed air to communicate the atomized water droplets to ambient air. The duct includes a mouth, throat, neck, and a mix joint to receive the atomized water droplets, which together communicate the atomized water droplets to a chute, C-joint, and canal, which together in turn communicate the atomized water droplets to the ambient air through a posterior air outlet while evaporating remaining atomized water droplets inside the duct.

Another aspect of the present subject matter includes a method form which recites a method for humidifying an aircraft cabin. The method comprises filtering water without freezing by operating static water pressure from an aircraft and producing filtered water by causing the water to enter stages of reverse osmosis, deionization, and final filtering. The method further comprises communicating atomized water droplets into ambient air through a duct that is capable of receiving atomized water droplets formed from the filtered water and compressed air while evaporating remaining atomized water droplets inside the duct.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a pictorial diagram illustrating an environment in which an archetypical aircraft humidifier operates in accordance with one embodiment of the present subject matter;

FIG. 2 is an isometric, perspective view illustrating an archetypical lidded aircraft humidifier in accordance with one embodiment of the present subject matter;

FIG. 3 is an isometric, perspective view of an archetypical unlidded aircraft humidifier assemblage in accordance with one embodiment of the present subject matter;

FIG. 4 is another isometric, perspective view of an archetypical aircraft humidifier assemblage in accordance with one embodiment of the present subject matter;

FIG. 5 is a further isometric, perspective view of an archetypical aircraft humidifier assemblage in accordance with one embodiment of the present subject matter;

FIG. 6 is a top plan view illustrating an archetypical aircraft humidifier assemblage in accordance with one embodiment of the present subject matter;

FIG. 7 is an additional isometric, perspective view of an archetypical aircraft humidifier assemblage in accordance with one embodiment of the present subject matter;

FIG. 8 is an isometric, front perspective view illustrating an archetypical duct in accordance with one embodiment of the present subject matter;

FIG. 9 is an isometric, back perspective view illustrating an archetypical duct in accordance with one embodiment of the present subject matter;

FIG. 10 is a top plan view illustrating an archetypical duct in accordance with one embodiment of the present subject matter;

FIG. 11 is a front view of an archetypical duct in accordance with one embodiment of the present subject matter;

FIG. 12 is a bottom plan view of an archetypical duct in accordance with one embodiment of the present subject matter;

FIG. 13 is a back view of an archetypical duct in accordance with one embodiment of the present subject matter;

FIG. 14 is a pictorial diagram illustrating an archetypical method for controlling an aircraft humidifier in accordance with one embodiment of the present subject matter;

FIG. 15*a* is an isometric, perspective view of an archetypical assembled duct 1500 in accordance with another embodiment of the present subject matter;

FIG. 15*b* is an isometric, exploded, perspective view of an archetypical unassembled duct 1500 in accordance with another embodiment of the present subject matter; and FIG. 15*c* is a plan view of an archetypical duct 1500 in accordance with another embodiment of the present subject matter.

DETAILED DESCRIPTION

Various embodiments of the present subject matter engineer an aircraft humidifier. Some embodiments engineer a stand-alone, fully integrated aircraft humidifier that is suitable for providing uniform, non-wetting humidified air disbursed by the aircraft humidifier into ambient air to increase the relative humidity in low humidity environments such as aircraft interiors, including cockpits, cabins, crew rests, cargo holds, and lavatories, as well as any other enclosed areas. The term "non-wetting" means the inclusion of a condition in which water is evaporated in air that is above the dew point. In many embodiments, the aircraft humidifier is engineered to include a water source, a supply of water, a water filter, compressed air, a specialized nozzle without moving parts, a duct (including, in some embodiments, a turbulator or an evaporator) to provide for maximum evaporation through the atomization of water, and an internal drainage and collection system to collect and recycle any loose un-evaporated water within the device to provide for a safe, sanitary and microbe-free environment. Depending on the interior aircraft dew point, in a few embodiments, it is engineered so that the produced humidification is not wetting to surfaces external to the aircraft humidifier by evaporating the water and the air, and surface temperatures are caused to be above the dew point of the humid air or vice versa.

FIG. 1 illustrates an aircraft cabin 100, an environment in which an aircraft humidifier 103 operates. The aircraft humidifier is a device that is capable of improving breathing air quality by increasing relative humidity for the crew and/or the passengers in the aircraft cabin 100 including a locally delimited area and a region surrounding the locally delimited area. The aircraft cabin 100 is a section of an aircraft in which passengers lounge for traveling. At cruising altitudes of modern aircraft, the surrounding atmosphere is too thin for passengers and crew to breathe without an oxygen mask, so cabins are typically pressurized at a higher pressure than the ambient pressure at various altitudes.

In commercial air travel, particularly in airliners, cabins may be divided into several parts. These can include travel class sections in medium and large aircraft, areas for flight attendants, the galley, and storage for in-flight services. Seats are primarily arranged in rows and alleys. Along these alleys, an aircraft galley service trolley 102 may be pushed or pulled by flight attendants to facilitate in-flight services to passengers. In various embodiments of the present subject matter, the aircraft humidifier 103 is housed by the aircraft galley service trolley 102 so as to facilitate humidifying the aircraft cabin 100. In a few embodiments, the aircraft humidifier 103 is suitably connected to an aircraft environmental control system (not shown) instead of being housed by the aircraft galley service trolley 102.

FIG. 2 illustrates the aircraft humidifier 103 that is covered. In a few embodiments, the aircraft humidifier 103 is engineered so as to have a capacity to provide healthier air for passengers and crew. The aircraft humidifier 103 includes a lid 211 to protect the internal aircraft humidifier assemblage. A control jack 209 is provided on a side of the lid 211 to allow a remote controller 205 to connect to the control jack 209 so as to facilitate programming or controlling the aircraft humidifier 103 via a control wire 207. In a few embodiments, the remote controller 205 interfaces with the aircraft humidifier 103 wirelessly, such as through Wi-Fi broadcasting in the aircraft cabin 100.

FIGS. 3-7 illustrate the aircraft humidifier assemblage with the lid 211 removed. The aircraft humidifier assemblage includes a water filter system 322. The water filter system 322 is coupled to a water source (not shown) to produce filtered water. In one embodiment, the water source is provided by a potable water supply on the aircraft; yet in another embodiment, the water source is a reservoir within the aircraft humidifier 103. In one embodiment, the water filter system 322 is suitably a three-stage system that includes a reverse osmosis stage, a deionized stage, and a final filtration stage. In two or three embodiments, the three-stage system uses aircraft static water pressure to operate, but nothing else. In some embodiments, the holding tank is suitably not used. In a few embodiments, the water filter system 322 is engineered to facilitate antifreeze. A water feed line (not shown) communicates the filtered water to a valve 331. The valve 331 is suitable for regulating the communication of filtered water to a nozzle 329.

The aircraft humidifier assemblage includes a pressurized air tank 313, which stores pressurized air. The aircraft humidifier assemblage includes a compressor 323 which is coupled to the pressurized air tank 313 to communicate pressurized air to be stored by the pressurized air tank 313. A pressurized air feed line (not shown) communicates pressurized air to the nozzle 329. In one embodiment, the compressor 323 is not used and instead the pressurized air tank 313 receives bled air from the aircraft. In another embodiment, the compressor 323 is not used and instead the pressurized air tank 313 receives compressed air from the aircraft. In a third embodiment, the compressor 323 is used to provide compressed air directly to the pressurized air feed line feeding the nozzle 329.

The nozzle 329 is engineered for projecting venting, without moving parts, the filtered water communicated by the water feed line and the pressurized air communicated by the pressurized air feed line, in one embodiment, to produce atomized water droplets. In a second embodiment, the nozzle 329 is engineered to speed up, without moving parts, the filtered water communicated by the water feed line and the pressurized air communicated by the pressurized air feed line, to produce atomized water droplets. In a third embodiment, the nozzle 329 is engineered to accelerate the filtered water communicated by the water feed line and the pressurized air communicated by the pressurized air feed line, to produce atomized water droplets.

The atomized water droplets (or exhausted humidified air) are communicated by the nozzle 329 to a duct 315 (duct, turbulator duct, evaporator duct, exhaust duct, and mixing duct may be used interchangeably). The duct 315, in one embodiment, is engineered to incorporate corrugated internal surfaces to agitate the evaporation of atomized water droplets. In a second embodiment, the duct 315 is engineered to facilitate a spiral curvilinear passage. In a third embodiment, the spiral curvilinear passage is suitably an expanding spiral. In a fourth embodiment, the spiral curvilinear passage is suitably a constant area spiral. In a fifth embodiment, the duct 315 is engineered to have variable side walls to minimize or maximize the rate of outflow. In almost all embodiments, the duct 315 is engineered to cause a further mixing of the air/water mixture in the form of atomized water droplets to ensure full evaporation.

A sump 317 is capable of collecting moisture leaking from the duct 315. Any leaked moisture is detected and communicated by a sump moisture sensor 319. Actual moisture in the sump 317 is communicated on a sump water recycle line 321 back to the water filter system 322. An air inlet port **327*b* is provided by the aircraft humidifier assemblage to allow air to enter into the compressor 323. The duct 315 is coupled to an air outlet port 325 as well as to an air inlet port 327*a*. The air outlet port 325 communicates the atomized water droplets to a locally delimited area of the aircraft cabin 100 and so as to feed humidified air into the locally delimited area of the aircraft cabin 100 during normal operation of the aircraft. In one embodiment, the atomized water droplets are communicated by the aircraft humidifier 103 to ambient air without the use of the air outlet port 325**. In another embodiment, the atomized water droplets are communicated to the environmental control system of the aircraft, which in turn communicates the atomized water droplets to ambient air.

Figure 7:
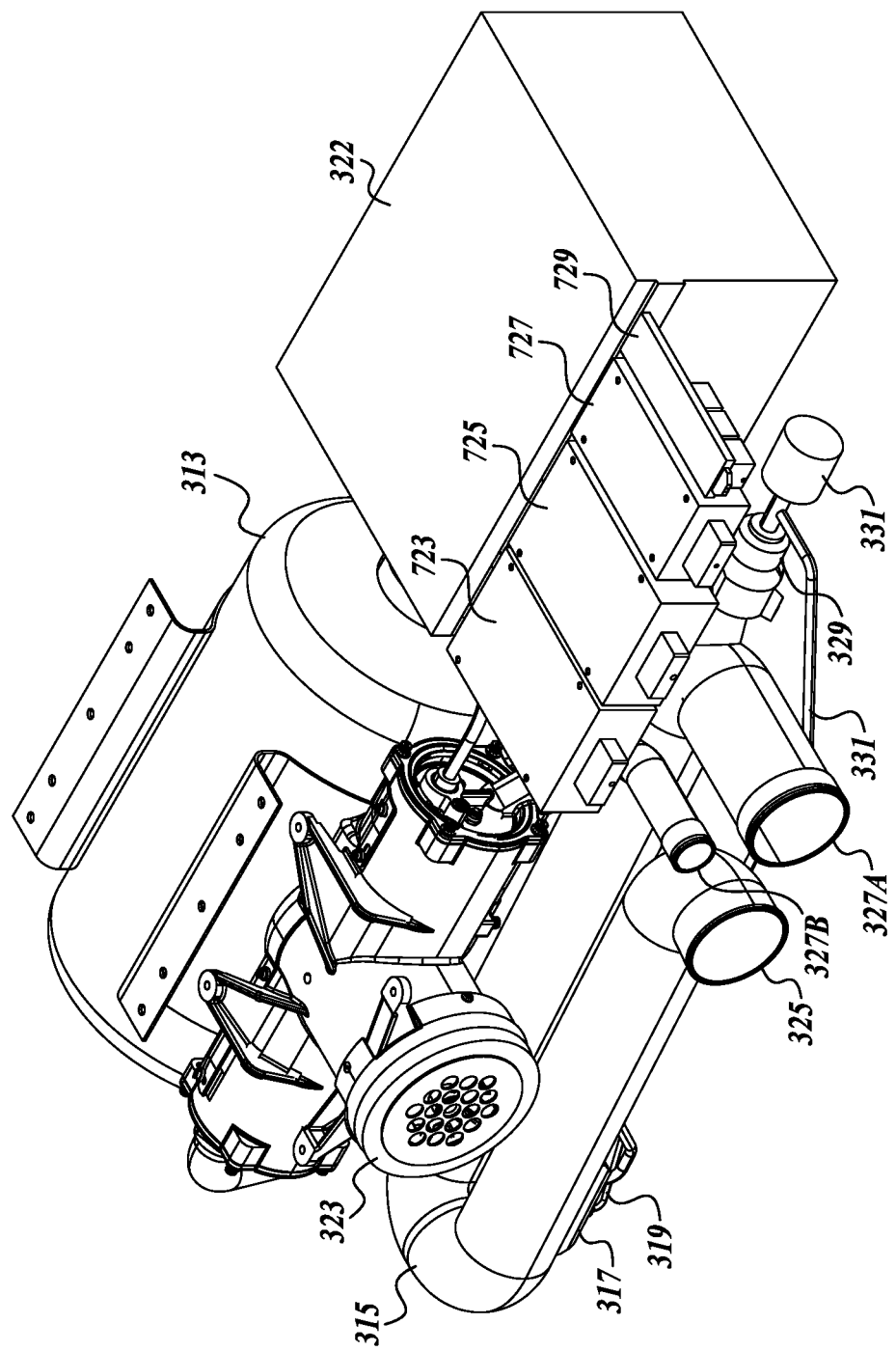

FIG. 7 illustrates the electronics portions of the aircraft humidifier assemblage in greater detail. The aircraft humidifier assemblage includes a DC-DC converter 723, an AC power isolator 725, a diode module 727, a series of relays 729, sensors (not shown), and solenoids (not shown). The DC-DC converter 723 converts DC voltage of the aircraft to a DC voltage that powers the remote controller 205. The diode module 727 is a rectifier portion of a DC circuit (a combination of the aircraft's DC voltage source, the DC-DC converter 723, and the diode module 727), which acts to isolate the remote controller from the aircraft electrically. The AC power isolator 725 acts to isolate the alternating current source of the aircraft from those portions of the aircraft humidifier assemblage (e.g., the water filter system 322 and the compressor 323).

FIGS. 8-13 illustrate the duct 315 in greater detail. The duct 315 includes a mouth 831 that has the capacity to receive the atomized water droplets from the nozzle 329. The mouth forms a circular orifice that is larger than the diameter of a throat 833. The atomized water droplets are communicated from the mouth 831 to the throat 833, and then the atomized water droplets traverse through a neck 835. The neck 835 is conical with its apex terminated at an angle. The neck 835 communicates the atomized water droplets to a mix joint 837. Coupled to the mix joint 837 is a chute 839 through which the atomized water droplets are further communicated. The chute 839 is suitable for communicating the atomized water droplets longitudinally along its length to a C-joint 841. The C-joint 841 communicates the atomized water droplets to a canal 843. Coupled to the canal 843 is the sump 317 located at the bottom of the canal 843. The canal 843 then communicates the atomized water droplets along its length, which is parallel to the chute 839 to a posterior joint 845 where the atomized water droplets exit through the posterior outlet 847. Suitably, the posterior outlet 847 is an annular opening. The mix joint 837 is also coupled to an air cavity 851 which at its terminal is an anterior air inlet 849. Suitably, the air cavity 851 is located perpendicularly to the chute 839 when fastened to the mix joint 837. Inside the air cavity 851, a fan 1153 is housed.

In one embodiment, the aircraft humidifier 103 is engineered to have a metallic or a composite liner which is water resistant and non-permeable to prevent leakage or contamination. In another embodiment, the aircraft humidifier 103 is engineered to include internal mechanisms to evaporate free water within the device. In a further embodiment, the aircraft humidifier 103 is engineered to recycle any free water within the device for deployment as humidification. In an additional embodiment, the aircraft humidifier 103 is engineered to facilitate access to internal components for maintenance, repair, and cleaning. In a concrete embodiment, the aircraft humidifier 103 is engineered to incorporate analog and/or digital controls for monitoring, switching, transmitting, metering, measuring, sensing, lighting, cleaning, and connecting to existing environmental control systems. In a specific embodiment, the aircraft humidifier 103 is engineered to be incorporated in a customized container which is the size of a typical aircraft galley service trolley and which then may be incorporated into the galley trolley insert locations with typical locking and docking mechanisms. In a latest embodiment, the aircraft humidifier 103 is engineered to include wheels or other mechanisms for mobility. In a latter embodiment, the aircraft humidifier 103 is engineered to be incorporated into the overhead storage bin of the aircraft's passenger cabin. In a latter embodiment, the aircraft humidifier 103 is engineered to be incorporated above or below the aircraft's passenger cabin. In an as yet further embodiment, the aircraft humidifier 103 is engineered to disperse disinfectants or other water soluble compounds into ambient air.

Figure 14:
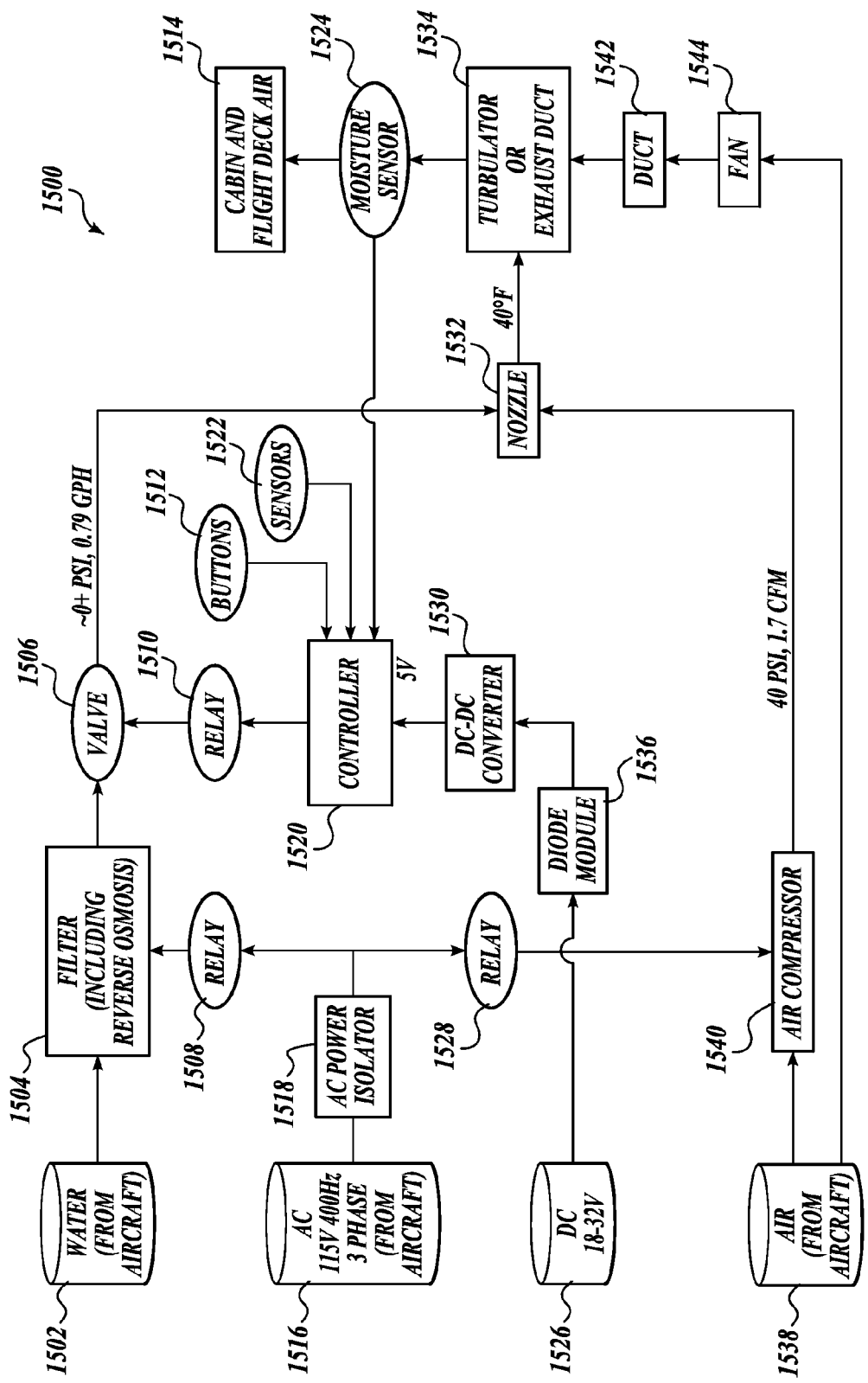
Figure 15A:
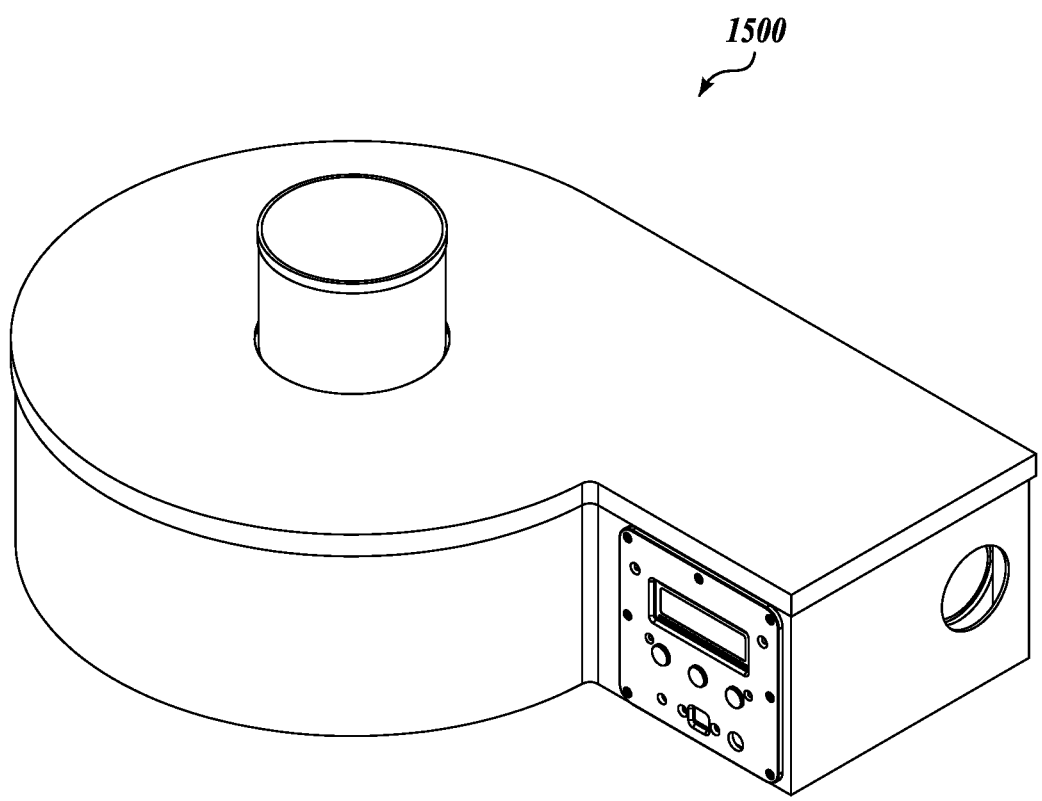
Figure 15C:
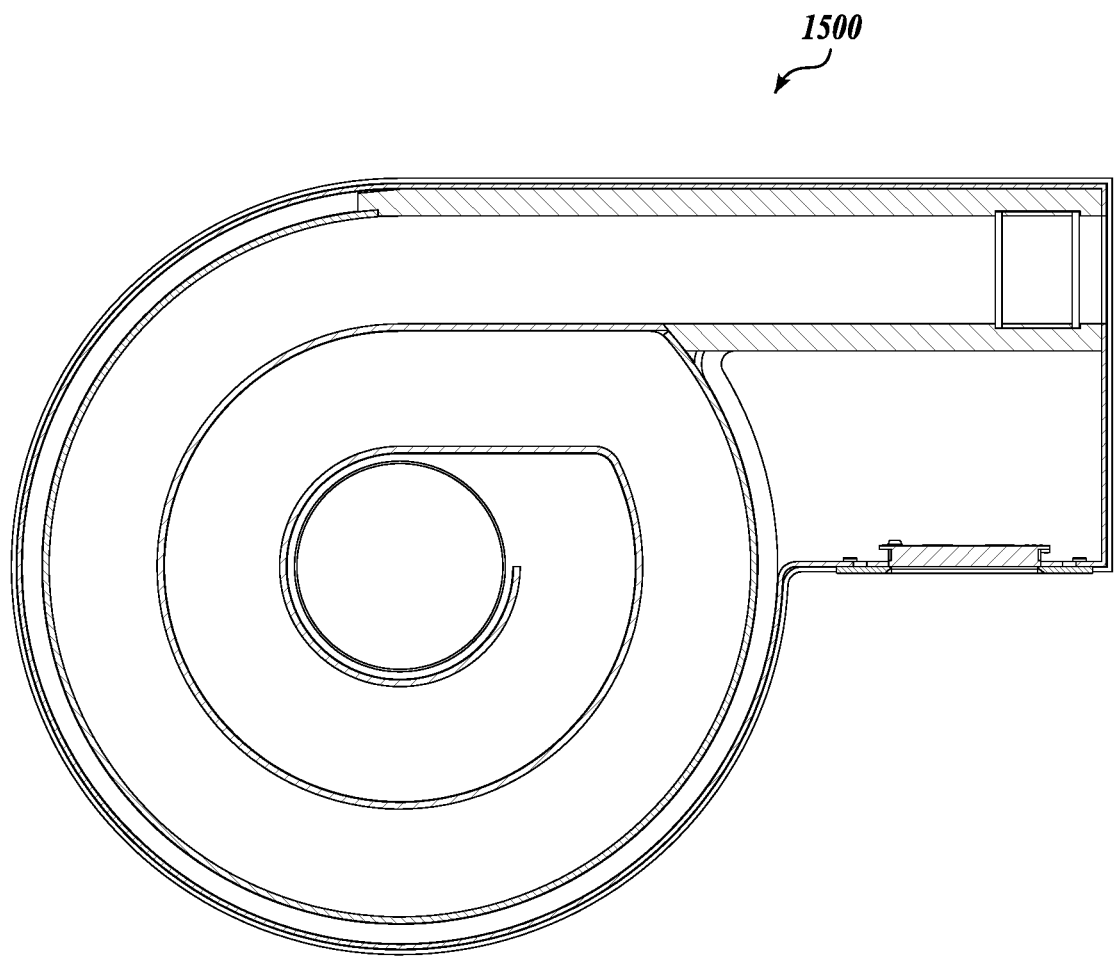

FIG. 14 illustrates an archetypical method 1500 for controlling an aircraft humidifier. A controller 1520 communicates with a relay 1510 to open or close a valve 1506 so as to allow water from an aircraft 1502 which has been filtered by a filter 1504 (which is capable of reverse osmosis, deionization, and so on) to the valve 1506 so as to enter a nozzle 1532. A voltage source 1516, which in one embodiment is alternating current rated at 115 volt, 400 hertz, 3-phase from the aircraft, is coupled to an AC power isolator 1518. The power coming out from the AC power isolator 1518 is communicated to a relay 1508 to control the filter 1504 and a relay 1528 to control an air compressor 1540. A direct current power source 1526 of approximately 18-32 volts is communicated to a diode module 1536. The diode module 1536 acts to rectify the power coming from the DC voltage source 1526 and communicates the power to a DC-DC converter 1530. The converted power is presented to the controller 1520 to power it. Air source 1538 is provided by the aircraft and is provided to both the air compressor 1540 as well as to a fan 1544. The air compressor 1540 compresses the air from the air source 1538 and presents the compressed air to the nozzle 1532. The resultant air product (in the form of atomized water droplets) coming from the nozzle 1532 is presented to a turbulator or exhaust duct 1534. The fan 1544 also conducts air through a duct 1542 and also to the turbulator or exhaust duct 1534. The air moves through a moisture sensor 1524, which communicates its findings back to the controller 1520 and permits the air to enter the cabin and flight deck air 1514. The method 1500 supplies humidified air into the aircraft cabin 100, including a locally delimited area and a region surrounding the locally delimited area. The method 1500 humidifies the air with a water source. The method 1500 then feeds the humidified air at the first partial pressure through a feed line into the locally delimited area during normal operation of the aircraft. The first partial pressure is higher than a second oxygen partial pressure in the region surrounding the locally delimited area.

While illustrative embodiments have been illustrated and described, it will be appreciated that various changes can be made therein without departing from the spirit and scope of the invention.

The invention claimed is:

1. A system comprising:
an aircraft humidifier comprising:
  a water filtration system that is suitable to produce filtered water without freezing, the water filtration system operating by static water pressure from an aircraft and including stages selected from a group consisting essentially of reverse osmosis and deionization; and
  a duct that is capable of receiving atomized water droplets formed from the filtered water and compressed air to communicate the atomized water droplets to ambient air, the duct including a mouth, throat, neck, and a mix joint to receive the atomized water droplets, which together communicate the atomized water droplets to a chute, C-joint, and canal, which together in turn communicate the atomized water droplets to the ambient air through a posterior air outlet while evaporating remaining atomized water droplets inside the duct; and an aircraft galley service trolley on wheels in which the aircraft humidifier is housed.

2. The aircraft humidifier of claim 1, wherein the duct further includes an air cavity and an anterior air inlet, which communicates air through the air cavity into the mix joint, the air cavity including a fan.

3. The aircraft humidifier of claim 2, further comprising a compressor which compresses air to produce the compressed air.

4. The aircraft humidifier of claim 3, further comprising a pressurized air tank for storing the compressed air produced by the compressor.

5. The aircraft humidifier of claim 4, further comprising a valve which has a capacity to receive the filtered water and communicate the filtered water.

6. The aircraft humidifier of claim 5, further comprising a nozzle which is suitable for receiving the filtered water from the valve and the compressed air from the compressor, the nozzle communicating the atomized water droplets to the duct.

7. The aircraft humidifier of claim 6, further comprising a sump coupled to the duct, which is capable of collecting moisture leaking from the duct.

8. The aircraft humidifier of claim 7, further comprising a sump moisture sensor coupled to the sump, which has a capacity to detect moisture and communicate such a detection.

9. The aircraft humidifier of claim 8, further comprising a water recycle line coupled to the sump, which is suitable for communicating moisture from the sump back to the water filter system.

* * * * *